April 9, 1963 E. P. NEY 3,084,546
WIRE THERMOMETER
Filed June 26, 1959
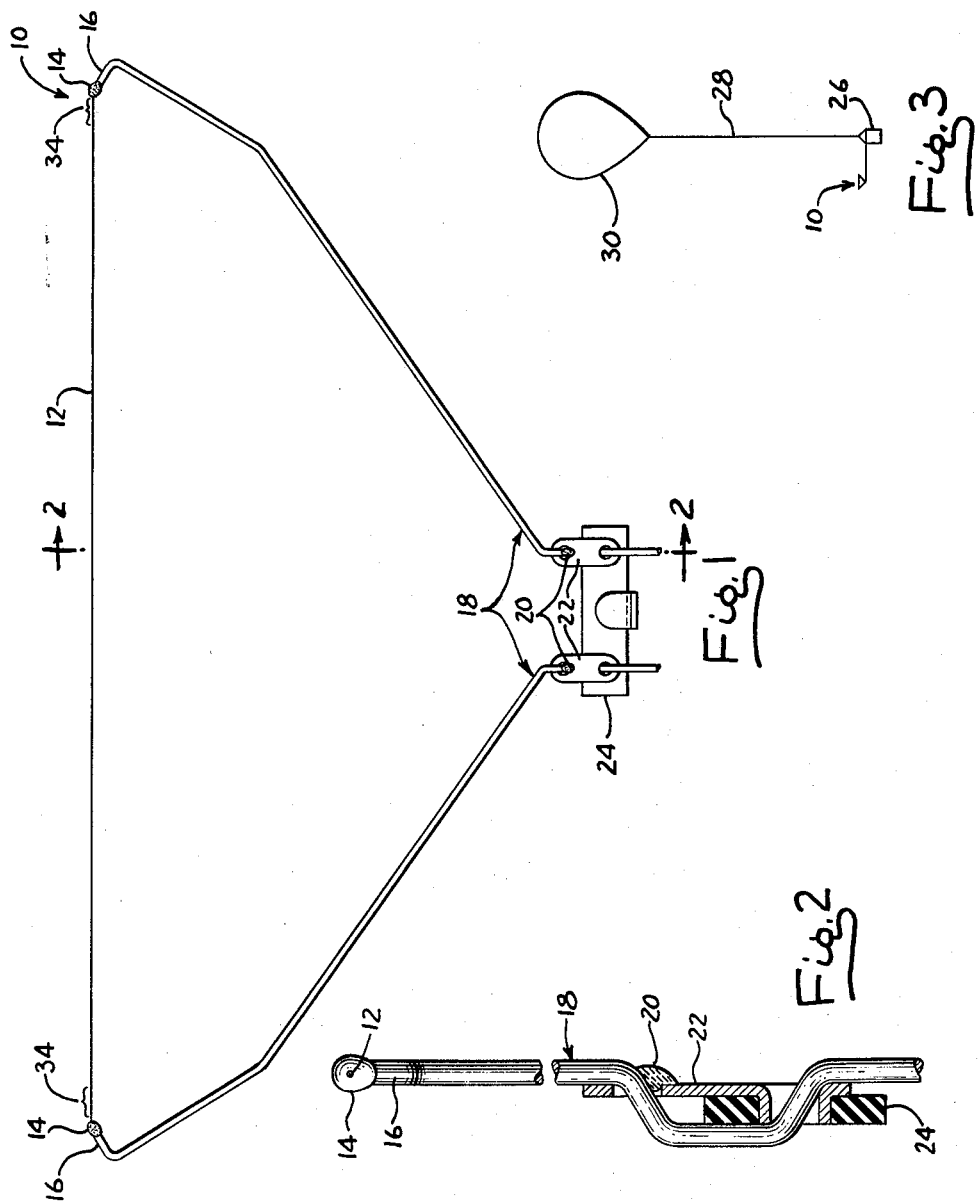
INVENTOR
EDWARD P. NEY
by: Louis Sheldon ATTYS.

United States Patent Office 3,084,546
Patented Apr. 9, 1963

1

3,084,546
WIRE THERMOMETER
Edward P. Ney, Minneapolis, Minn., assignor, by mesne assignments, to the United States of America as represented by the Secretary of the Navy
Filed June 26, 1959, Ser. No. 823,269
3 Claims. (Cl. 73—343)

This invention relates to temperature measurement and is concerned more particularly with the accurate measurement of atmospheric air temperatures at high altitudes up to about 150,000 ft. (about 1 millibar).

It has been the practice in high altitude balloon flights to measure the air temperature by means of a thermistor exposed to the air and connected in the circuitry of a radiosonde whose temperature signals varied with the resistance of the thermistor. Thermistors are affected by infrared radiation so that they do not give a true measure of the air temperature. Up to altitudes of about 80,000 ft., however, the radiation error with the best thermistors does not exceed 1%, so that at such altitudes thermistors have been satisfactory. However, at the higher altitudes (approaching 150,000 ft.) which balloons have recently achieved, the radiation error is so great as to render the thermistor too inaccurate for air temperature measurement.

It is accordingly an object of the invention to provide an air thermometer which is substantially more accurate than a thermistor up to altitudes of about 150,000 ft.

A further object is to provide an air thermometer whose radiation error is negligible at altitudes up to at least about 150,000 ft.

Further objects and advantages of the invention will appear as the description proceeds.

The invention will be better understood on reference to the following description and the accompanying more or less schematic drawing, in which:

FIG. 1 is an elevational view of a wire thermometer embodying features of the invention.

FIG. 2 is an enlarged sectional view taken as indicated at 2—2 in FIG. 1.

FIG. 3 shows a balloon system including the thermometer.

In many atmospheric physics and meteorological experiments and investigations a knowledge of atmospheric air temperature and its variations is vital to the understanding of the nature of the atmosphere.

An ideal thermometer immersed in the air would come precisely to the temperature of the air without time lag. Because of infrared radiation, any thermometer will indicate a different temperature from that of the ambient air; because of the thermometer's time constant, there is always a time lag; and the power put into the thermometer for telemetering purposes may also cause it to differ from the air temperature.

An object placed in an air mass is "pulled" toward the temperature of the air mass by conduction and convection. At altitudes above about 100,000 ft., where convection is an insignificant factor, the heat exchange is due essentially only to conduction. The conduction heat exchange per unit temperature difference per unit length for a cylindrical thermometer is substantially independent of pressure until the pressure is reduced to a value at which the thermometer diameter does not exceed the mean free molecular path in the air; at such reduced pressures the heat transfer drops approximately linearly with pressure since the heat transfer then depends on the number of molecular impacts which are made and this number decreases approximately linearly with pressure. This low pressure crossover point, at which the conduction changes from classical conduction to kinetic theory conduction, is therefore determined by the thermometer diameter. The mean free molecular path in atmospheric air at ground pressure (about 1000 mb.) is $6.4 \times 10^{-6}$ cm. At a pressure of 1 mb. (about 150,000 ft.) the mean free molecular path is $6.4 \times 10^{-3}$ cm., or about 0.0025 inch, so that, at that pressure, a thermometer substantially less than about 2.5 mils in diameter will undergo conduction heat transfer less efficiently. Because, however, the smaller the thermometer diameter, the smaller is the effect of radiation on the thermometer, it is desirable from a radiation standpoint to make the thermometer as thin as possible. A 1-mil aluminum-coated tungsten wire is a good optimum for minimum errors up to about 150,000 ft.

The figure of merit of a thermometer is the ratio of the heat transfer by conduction and convection to the net heat transfer by radiation. It is accordingly obvious that this ratio is much greater for a 1-mil diameter air thermometer than for the best air temperature detecting thermistors (of which the ML 419/AMT-4, a white cylindrical thermistor having a diameter of about 30 mils and a length of about 3 cm., is an example). The 1-mil diameter thermometer measures very accurately temperatures at pressures as low as 1 mb., where its ratio of heat transfer to black body radiation at 24° C., for example, is about 20. The corresponding ratio for the best white thermistors is only about 4.

A significant factor is the ratio of the conduction heat transfer at any pressure to the vacuum radiation heat transfer. The larger this ratio, the more efficient is the thermometer. A thermistor behaves as a black body with an emissivity of 1 in the infrared. An uncoated 1-mil tungsten wire thermometer has a much smaller emissivity, and the aluminum-coated 1-mil tungsten wire thermometer was found to have a still smaller emissivity, amounting to 0.1. The emissivity of an oxidized aluminum 1-mil tungsten wire thermometer, though greater than 0.1, is much lower than 1.

It has been suggested that high ventilation rates might improve the accuracy of large diameter thermometers at high altitude. At ground atmospheric pressure a ventilation rate of 1000 ft./min. increases the heat loss of both a 1-mil wire thermometer and a thermistor by a factor of about 3. However, this effect decreases with pressure, and at pressures below 10 mb. ventilation does not appreciably affect the efficiency of air thermometers.

The time constant T of the thermometer is $$T = \frac{MC_p}{q} = \frac{\pi R^2 P C_p}{q}$$

where M is the mass per unit length, $C_p$ is the heat capacity per unit mass, R is the radius of the cylinder, P is the density of the thermometer, and $q$ is the conduction heat transfer per unit length per degree temperature difference. Since, therefore, for a given density of the thermometer, the time constant varies approximately as the square of the radius, it is possible to detect accurately in the atmosphere, with a small diameter thermometer, temperatures which cannot be detected with a large diameter thermometer (such as a thermistor) because of the latter's prohibitive time constant. At ground atmospheric pressure (about 1000 mb.) with no convection the white thermistor has a time constant of 10 seconds, whereas the 1-mil diameter tungsten wire has a time constant of only 90 milliseconds, which is negligible.

The product $q$T is the heat capacity of a thermometer, and, from the above equation, can be written $$qT = \pi R^2 P C_p$$

The value of $q$T for a thermistor is two to three times that for a 1-mil wire thermometer, due to the fact that, when the input power is turned off, the thermal capacity of the air in the immediate vicinity of the wire is substantially the same as the thermal capacity of the wire, so that the heat loss from the wire cannot be determined from the time constant as has been done in the case of the thermistor due to the latter's relatively large diameter.

Using laboratory-determined values for the heat transfer of thermometers, it is possible to calculate the temperature errors of thermometers in radiosonde flights. These errors are calculated separately for the infrared effect and the essentially visible solar effects.

The 1000 ft./min. ventilated thermistor up to 60,000 ft. (about 70 mb.) will have an error approaching 0.4° C.; up to 80,000 ft. (about 30 mb.) the error will approach 1° C.; up to 100,000 ft. (about 10 mb.) the error will approach 2° C., which is objectionable; the error continues to increase with altitude, and, at 150,000 ft. (about 1 mb.), is 10° C., which of course is especially objectionable.

At altitudes up to 130,000 ft. (about 3 mb.) the infrared radiation error exhibited by a 1-mil wire thermometer is less than 0.1° C.; the error increases with altitude, but even at 150,000 ft. the error is only about 0.3° C., which of course is negligible.

Thus the fine (1-mil) wire thermometer has negligible error at all altitudes up to about 150,000 ft., whereas the thermistor error is objectionably high at altitudes substantially above 80,000 ft.

The maximum sunrise (i.e., solar radiation heating) effects are of course expected when the solar radiation flux is normal to the thermometer axis. At altitudes up to 100,000 ft. the sunrise effect on the white thermistor approaches 1° C. This figure may be increased by a factor of 3 or 4 due to dirtying of the thermistor from handling, with consequent increase in the sunrise effect by several degrees. The maximum sunrise effect on the 1-mil aluminized tungsten wire thermometer reaches the negligible value of about 0.2° C. at an altitude of about 150,000 ft. and does not exceed 0.1° C. at altitudes up to about 100,000 ft.

The power input used to measure thermometer resistance to evaluate temperature can be held to so low a figure that the introduced heating error for the 1-mil wire thermometer does not exceed 0.1° C. and thus can be neglected.

The foregoing discussion indicates the nature of the fixed errors inherent in a thermometer immersed in air in the presence of a radiation field. Below is considered the effect of the balloon and balloon-carried equipment temperatures on the thermometer carried by the balloon.

When the balloon system is substantially at one altitude, it has an appreciable effect on the temperature of the ambient air. When there is relative motion between the balloon system and the ambient air, as when the balloon is ascending or descending, the boundary layer becomes so broken up and turbulent that the balloon system has substantially less effect on the temperature of the ambient air. The heat from the telemetering equipment also affects the temperature of the ambient air. It has been found from a number of test flights that, if the thermometer is located about three or more feet from the gondola and load line and at least about 100 ft. to 200 ft. from the balloon envelope, the effect of the balloon system on the temperature of the air ambient to the thermometer will be negligible regardless whether or not the balloon system is changing altitude.

Referring now more particularly to the drawing, disclosing an illustrative embodiment of the invention, there is shown at 10 a thermometer comprising a 1-mil aluminum-coated tungsten wire 12 whose ends are crimped and soldered at 14 to the ends 16 of stiff aluminum-coated copper supporting leads 18 soldered at 20 to lugs 22 secured to an insulating terminal strip 24 so as to hold the wire taut, the leads being adapted to be connected into the circuitry of a conventional radiosonde (not shown) supported by a gondola 26 suspended by a load line 28 from a high altitude balloon 30, with the wire and leads immersed in the atmospheric air. The wire 12 is spaced far enough from the balloon 30, load line 28, radiosonde, and other balloon-borne equipment to preclude appreciable influence of heat therefrom on the temperature of the air ambient to the wire. A spacing of the thermometer 10 at least about three feet from the gondola 26 and load line 28 and at least about 100 ft. to 200 ft. from the balloon 30 will generally be suitable for this purpose.

The wire 12 is preferably tungsten because of its tensile strength, ability to withstand vibration, ability to be readily drawn to a 1-mil diameter, high yield strength, high product of relative resistance (compared to copper) and temperature coefficient of resistivity, negligible time constant, and substantially linear change in resistance with temperature, and the purpose of the aluminum coats is to reflect radiation without appreciably adding to the thickness of the wire and leads. The leads 18 may be of any suitable metal, such as copper, having a diameter not substantially exceeding and preferably about 30 mils, to provide an adequately stiff support for the wire, afford conductors of low resistance so that their resistance will not appreciably affect the resistance of the thermometer as a whole, keep the radiation effect on the leads at a low value, and have negligible heating effect on the air ambient to the wire 12. The coats on the leads 18 reduce the radiation effect on the leads to such an extent that the leads are about as near to the ambient air temperature at altitudes up to 150,000 ft. as a good thermistor would be. The leads 18 are preferably resiliently yieldable to maintain the wire 12 substantially taut notwithstanding expansion and contraction of the wire.

Due to heat conduction from the leads 18 the exposed wire end portions 34 in the near vicinity of the leads are at a different temperature than the intervening part of the wire. This difference is greatest immediately adjacent the leads 18 and is negligible about 3/8" from the leads, and accordingly, particularly at altitudes above 80,000 ft., could have an appreciably effect on the total resistance of the wire if the wire were relatively short. The length of the wire 12 is accordingly made sufficiently great that the effect of this temperature difference on the total resistance of the wire is known to be negligible. The minimum exposed wire length which is suitable for a maximum error of about ½° C. is about 10".

Other metals for the wire and leads may be used. Copper would be unsuitable for the wire not only because of its lack of linearity in change of resistance with change in temperature for the purpose of this invention, but also, among other things, because of its low yield strength at a diameter of 1 mil. An otherwise suitable wire having as low a product of relative resistance and temperature coefficient of resistivity as copper might be used instead of tungsten, but its change in resistance per degree change in temperature would be so small that the conventional radiosonde could not be used, but would require substantial addition of amplification to enable small changes in air temperature to be recorded or transmitted with a suitable degree of accuracy. The resistance of tungsten, on the other hand, is so highly sensitive to small changes in temperature that no amplification is required to be added to the conventional radiosonde. The aforementioned product for tungsten is 0.0146; for copper it is only 0.004. Thus it is preferred to use a wire metal having, among other things, a resistance which is highly sensitive to small changes in temperature.

Although aluminum coats, sputtered or electro-deposited or otherwise suitably applied, afford the desired degree of radiation reflectivity, other coatings of suitable reflectivity may be employed. The coats are preferably films which are very thin compared to the materials coated. The soldering 20 is preferably similarly coated.

While a preferred embodiment has been described in some detail, it should be regarded as an example of the

I claim:

1. In a high altitude air thermometer to be carried by a free balloon and immersed in the atmosphere, a bare highly radiation reflective metal wire whose electrical resistance is highly sensitive to small changes in and varies linearly with ambient atmospheric air temperature and having a diameter of about one mil and a length of about 10 inches, relatively stiff wire leads connected to the ends of the wire and being of negligible electrical resistance compared to that of the wire, and means rigidly supporting the leads remote from the wire, the leads between the wire and the supporting means being elongated and resiliently yieldable and holding the wire taut notwithstanding expansion and contraction of the wire.

2. The structure of claim 1, characterized in that the leads are the only means contacting the wire.

3. In a high altitude air thermometer to be carried by a free balloon and immersed in the atmosphere, a metal wire whose electrical resistance varies substantially linearly with its temperature, and having a diameter of about one mil and a length of at least about 10 inches, and leads connected to the ends of the wire and having an electrical resistance which is negligible compared to that of the wire, the leads being resiliently yieldable and maintaining the wire taut notwithstanding expansion and contraction of the wire.

References Cited in the file of this patent

UNITED STATES PATENTS

| | | |
|---|---|---|
| Re. 24,436 | Jacobson et al. | Feb. 25, 1958 |
| 1,984,112 | Buchholz | Dec. 11, 1934 |
| 2,022,515 | Orchard | Nov. 26, 1935 |
| 2,379,058 | Anderson | June 26, 1945 |
| 2,721,156 | Steuk | Oct. 18, 1955 |
| 2,863,033 | Wallace | Dec. 2, 1958 |

OTHER REFERENCES

Book: "Meteorological Instruments," by Middleton and Spilhaus, U. of Toronto Press (1953), pages 60, 84, 256, 261. (Copy in Scientific Library, U.S. Patent Office.)

Book: "Physics in Meteorology," by Best, Pitman Publishing Co. (1957), page 10. (Copy in Scientific Library U.S. Patent Office.)

Publication: "Electronic Equipment," Oct. 1954, article "Design of a Hot Wire Anemometer," by Pearson, page 8. (Copy in Scientific Library U.S. Patent Office.)